United States Patent
Walker

[11] Patent Number: 5,305,943
[45] Date of Patent: Apr. 26, 1994

[54] SPLINED ASSEMBLY

[75] Inventor: Herman B. Walker, Rochester, Mich.

[73] Assignee: Koppy Corporation, Orion, Mich.

[21] Appl. No.: 977,994

[22] Filed: Nov. 18, 1992

Related U.S. Application Data

[62] Division of Ser. No. 839,513, Feb. 20, 1992, Pat. No. 5,180,043.

[51] Int. Cl.$^5$ ............................................. F16D 13/62
[52] U.S. Cl. .................................. 228/176; 228/131; 29/428; 29/453; 29/457
[58] Field of Search ............... 228/126, 131, 101, 176; 301/83, 106; 138/153, 172; 220/640, 642; 29/428, 453, 457, 469.5

[56] References Cited

U.S. PATENT DOCUMENTS

| | | | |
|---|---|---|---|
| 689,748 | 12/1901 | Quinn | 220/640 |
| 1,161,409 | 11/1915 | Peckham | 220/640 |
| 1,179,188 | 4/1916 | Kanty et al. | 220/640 |
| 2,774,384 | 12/1956 | Wallace | 138/172 |
| 3,841,452 | 10/1974 | Newsock et al. | 192/107 R |
| 3,922,932 | 12/1975 | Maurice et al. | 475/284 |
| 4,014,619 | 3/1977 | Good et al. | 403/359 |
| 4,047,731 | 9/1977 | VanAuken | 138/172 |
| 4,327,473 | 5/1982 | Somerville | 138/172 |
| 4,813,522 | 3/1989 | Fujioka et al. | 192/70.2 |
| 4,997,073 | 3/1991 | Fujioka et al. | 192/70.2 |

*Primary Examiner*—Samuel M. Heinrich
*Attorney, Agent, or Firm*—Howard & Howard

[57] ABSTRACT

A splined assembly 10 is disclosed and includes a generally annular outer spline member 12 into which a second generally annular inner spline member 14 is rotatably placed. Member 12 includes a plurality of splines 22, 24, each having a snap ring reception slot 30 formed therein. In a first embodiment, housing member 12 also includes a band 34 which substantially surrounds the housing member 12 and overlays slots 30. In a second embodiment, housing 12 includes a plurality of elliptically protruding portions 40, each of which is positioned between pairs of adjacent splines 22, 24. Both band 34 and portions 40 are effective to prevent structural deformation caused by the received snap ring.

4 Claims, 2 Drawing Sheets

SPLINED ASSEMBLY

This is divisional of co-pending application Ser. No. 07/839,513 filed on Feb. 20, 1992, now U.S. Pat. No. 5,180,043.

FIELD OF THE INVENTION

This invention relates to a splined assembly and, more particularly, to an assembly having a first annular splined housing member rotatably contained within a second annular splined housing member.

DESCRIPTION OF THE PRIOR ART

Splined assemblies, usually comprising a first annular splined housing member rotatably contained within a second annular splined housing member, are employed in automotive transmissions, brake assemblies, and in many other apparatuses.

More particularly, each of the splined members usually has a generally annular body having splines circumferentially formed around the outer body surface. Each adjacent pair of splines provides an included plate reception groove which is adapted to receive clutch plates, which are movably and stackably disposed between the two members. Moreover, a snap or retainer ring is usually movably seated within retention grooves, formed within the uppermost or root portion of each spline of the second member. As is known in the art, the snap ring is adapted to be engaged by the movably stacked plates, thereby ensuring that the plates remain disposed between the two members and do not become axially separated from the assembly.

As is further known, the plates normally reside at the bottom portion of the assembly, between the outer surface of the contained first member and the inner surface of the second member. In this position, the plates are in disengaging relation to the plate reception grooves, thereby allowing the two members to independently rotate. Thereafter, as is known in the art, the plates are axially moved within the assembly, by means of a piston and made to forcibly engage the snap ring, thereby thrusting the snap ring against the root portion of each spline.

In this second thrusted position, the teeth of each of the stacked plates are seated or contained within one of the plate reception grooves formed between adjacent splines of a certain one of the members, thereby cooperatively interlocking the two members and forcing the members to rotate in unison. One example of such a known splined member is that described and claimed within U.S. Pat. No. 4,014,619 (the '619 patent), filed on Sep. 29, 1975; issued on Mar. 29, 1977; assigned to Applicant's Assignee; and fully incorporated herein by reference.

These snap ring retention grooves are usually formed, as explained in U.S. Pat. No. 4,813,522, ("the '522 patent"), issued on Mar. 21, 1989 to Fujioka, et al and assigned to Nissan Motor Company Limited, by "pressing out" and rupturing a predefined portion of each spline. While these "pressed out" and partially ruptured portions have allowed for the proper seating of the snap ring, they are known to be structurally weak and tend to deform due to the relatively large force imparted on them by the thrusted snap ring. Therefore, and as explained in the '522 patent, each annular member has been usually formed from a relatively thick steel plate, in order to ensure that the "pressed out" portions possess sufficient structural strength to resist deformation. Disadvantages associated with the use of such a thick steel plate, as further described in the '522 patent, include the need for a "special machine" with which to "press out" and rupture portions of the relatively thick steel and a relatively long member "production time". One approach to increase structural strength while reducing production cost is found in the '619 patent and involves the formation of slots in the root section of each spline. This approach has been found to be very effective and the embodiments of this invention as will be explained, may be used in combination with the teachings of the '619 patent to further increase structural strength.

Attempts to obviate the use of these thick plates while still producing a member having an acceptable structural strength include, as disclosed in the '522 patent, rupturing only one wall of each spline, while deforming or "bulging" the remaining wall portion. In this manner, the deformed portion supposedly "functions as a rib to increase the strength" of each spline while the snap ring seats within a relatively small groove formed by the single ruptured side wall.

This approach not only fails to adequately strengthen the member but also fails to consistently and adequately allow the snap ring to remain seated within the formed groove, since the snap ring is seated within only a relatively small portion of each spline. Accordingly, the ring has a tendency to dislodge when axially engaged by the snap ring, thereby causing assembly failure.

Another approach to increase spline strength is also described in the '522 patent and requires the use of "extruded channels" to "stop the snap ring" outside of the splined member. This approach again fails to strengthen the member. Moreover, these channels require complex production apparatuses and do not adequately ensure that the snap ring remains continuously seated within the retention grooves. For these reasons, this approach has also failed to address the difficulties associated with the prior art.

A further approach to alleviate these prior difficulties is described in U.S. Pat. No. 3,922,932, ("the '932 patent"), issued on Dec. 2, 1975 to Maurice, et al and assigned to Regie Nationale des Usines Renault. As described, abutments are formed adjacent to the usual snap ring aperture and are adapted to prevent the plates from axially separating from the assembly, thereby obviating the need for resilient snap rings and supposedly simplifying overall assembly production.

While these abutments axially immobilize the various clutch disks, they have been prone to structural deformity, have not adequately or consistently prevented the plates from separating from the assembly, and have failed to structurally strengthen the member.

There is therefore, a need to provide a splined assembly adapted to axially immobilize the several movably disposed clutch plates while maintaining structural integrity irregardless of the axial thrust force imparted to it by the contained plates and the snap ring.

SUMMARY OF THE INVENTION

It is an object of this invention to provide a splined assembly adapted to movably contain several clutch plates.

It is another object of this invention to provide a splined assembly including a splined member having snap ring retaining slots formed in each of the splines, the slots being adapted to cooperatively receive a snap ring which is effective to prevent the several contained clutch plates from axially separating from the assembly.

It is a further object of this invention to provide a splined housing assembly including at least two splined housing members, the assembly having a band which is circumferentially positioned and coupled to the outer surface of one of the splined housing members and which is adapted to overlay each of the snap ring retaining slots formed within that one splined housing member.

It is yet a further object of this invention to provide a splined housing assembly including an outer splined housing member having generally elliptically-shaped protruding or outwardly projecting portions which are each positioned between pairs of splines and which cooperatively allow the member to resist spline deformation.

According to a first aspect of this invention, a housing member is provided and comprises an annular splined body having lanced slots formed in the root section of each of the splines, the lanced slots being adapted to cooperatively and movably receive a snap ring. Moreover, the body further includes substantially identical protruding portions formed between each of the splines, the protruding portions being adapted to cooperatively allow the member to resist deformation.

According to a second aspect of the present invention a method is provided for preventing the deformation of snap ring reception splines formed in a housing. The method includes the steps of forming a band; and coupling the band to the housing such that the coupled band substantially surrounds the housing and overlays the root section of each of the formed splines.

Further objects, features and advantages of the invention will become apparent from a consideration of the following description and claims, when taken in conjunction with the accompanying drawings.

BRIEF DESCRIPTION OF THE DRAWINGS

Various advantages of the present invention will become apparent to those skilled in the art by reading the following specification by reference of the following drawings in which.

DETAILED DESCRIPTION OF THE INVENTION

Figure 3:
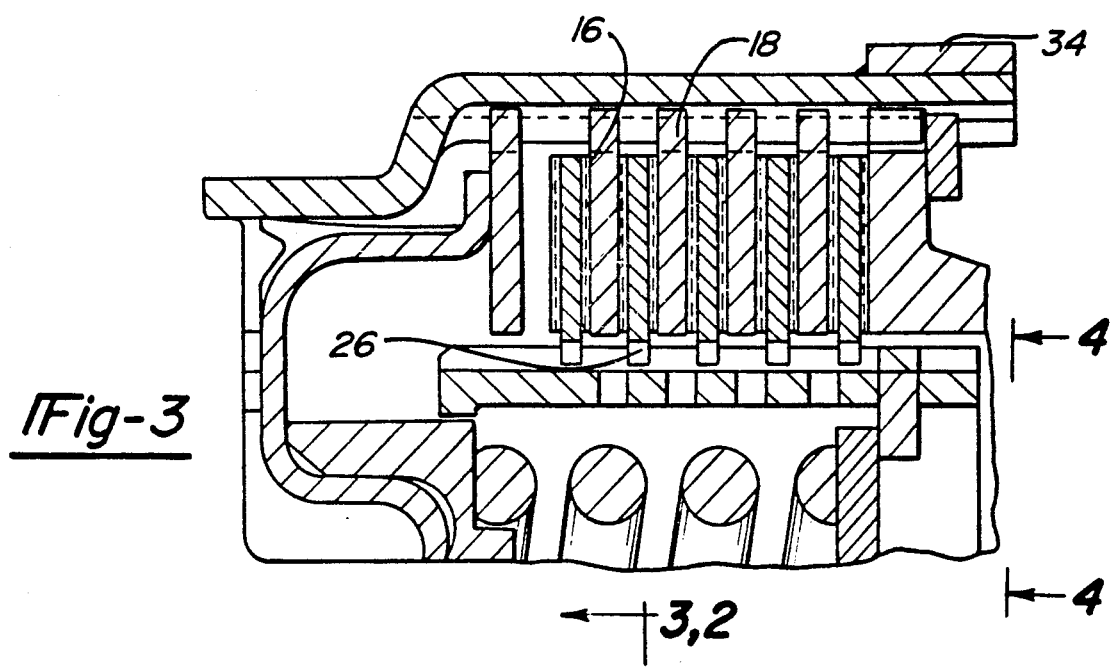
FIG. 3 is a cross-sectional view of the splined assembly shown in FIG. 1 and taken along the view line 3—3.
Figure 1:
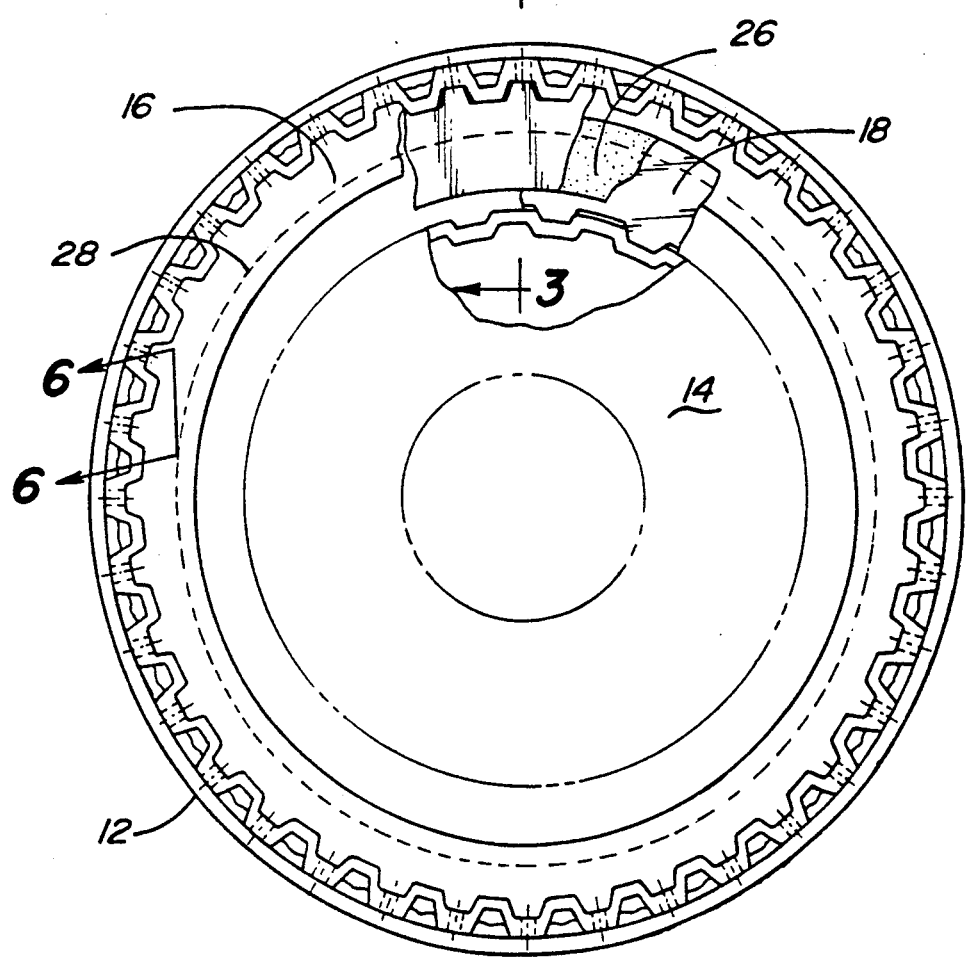
FIG. 1 is a fragmented plan view of a splined assembly made in accordance with the teachings of a first embodiment of this invention.
Figure 2:
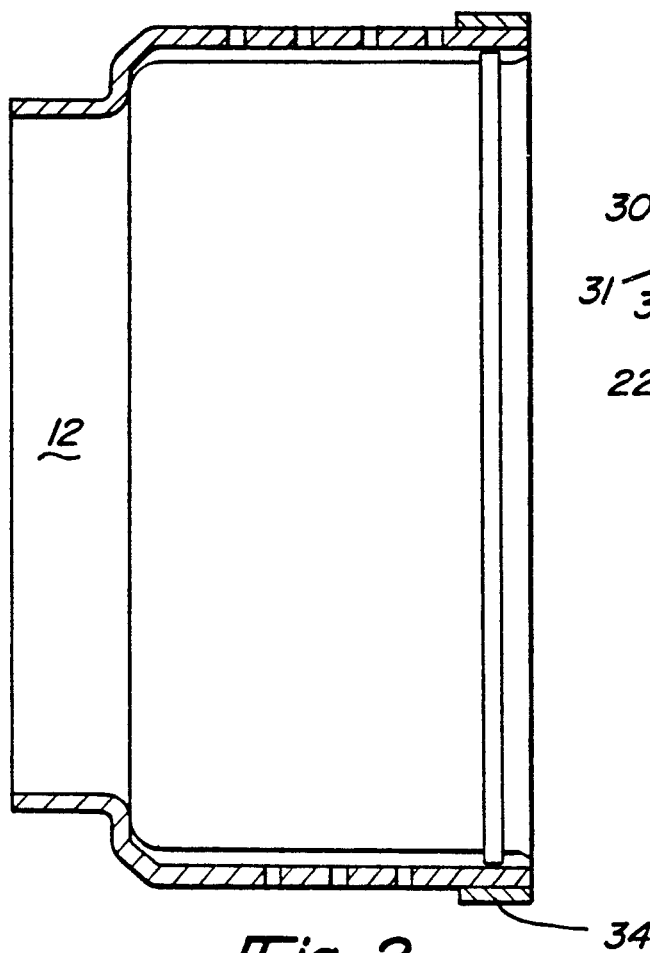
FIG. 2 is a cross-sectional view of the splined assembly shown in FIG. 1 and taken along view line 2—2.

Referring now to FIGS. 1 and 2, there is shown a splined assembly 10, made in accordance with the teachings of a first embodiment of this invention. As shown, assembly 10 includes a first outer and generally annular splined housing member 12 which is adapted to movably and rotatably contain a second generally annular splined housing member 14.

As shown best in FIGS. 1, 2, 3, and 6, several clutch plates, such as plates 16 and 18, are normally disposed between housings 12 and 14 and, as is known in the art, are made to initially reside upon the bottom portion 19 of housing 12, between the inner surface of member 12 and the outer surface of member 14. Thereafter, as is known in the art, a piston or other means (not shown) causes the plates 16, 18 to be movably seated within the included grooves 20, formed between adjacent splines 22, 24 on one of the housings 12, 14. Moreover, plates 16 and 18 are normally separated by a friction plate 26 which further immobilizes the seated plates 16, 18 and further ensures that the plates 16, 18 remain seated within grooves 20, thereby causing housings 12, 14 to selectively and interlockingly rotate in unison.

Figure 6:
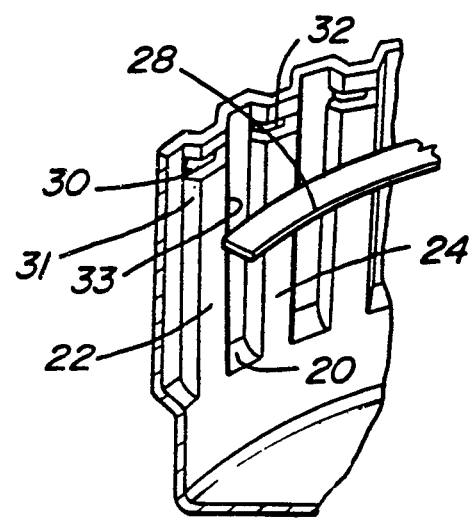
FIG. 6 is a fragmented perspective view of the splined assembly shown in FIG. 1 and taken along the view line 6—6.

As further shown in FIGS. 1 and 6, assembly 10 also includes a snap ring 28 (shown in phantom in FIG. 1) which is adapted to be movably received by each of the lanced snap ring retaining slots 30 which are transversely formed across and through the entire root section of each of tile splines 22, 24, of the outer housing member 12. As shown, each slot 30 is formed by lancing or rupturing both of the side walls 31, 33 of each spline root section.

Ring 28 is adapted, as is known by those of ordinary skill in the art, to become engaged by plates 16, 18, and 26 as they are movably seated within grooves 20 and is adapted to prevent the plates 16, 18, 26 from axially separating or exiting from the top portion of assembly 10. Moreover, as is known, the engaging plates 16, 18, 26 force ring 28 against each of the spline portions 32, lying above one of the slots 30. This force, as previously explained, is sometimes large enough to deform or bend spline portions 32, thereby causing ring 28 to move away from the corresponding plate retention position and allowing axial separation of the plates 16, 18, 26 from the assembly. In order to substantially prevent this deformation, it has been determined that assembly 10 should be modified in accordance one of the following two alternative embodiments of this invention.

Referring now to FIGS. 1 and 2 there is shown a band 34, which in a first embodiment of this invention, is placed around the outer circumference of housing member 12, such that the band substantially surrounds and is welded or attached to housing 12 while overlaying each of the slots 30 of splines 22, 24.

This welding most preferably comprises laser welding in order to maintain structural strength of the welded member 12. Such laser welding is known to those skilled in the art.

In this manner, band 34 adds columnar strength to each of the splines 22, 24 (and to member 12 in the vicinity of splines 22, 24), thereby opposing or preventing the deformation of portions 32 caused by the axial thrust of the snap ring 28. It should be realized that band 34 may be of any desired thickness and width, the only requirement being that it overlay slots 30. Moreover, it should also be realized that band 34 may be made of steel or any other desired material that would strengthen assembly 10 in the previously described manner.

Figure 5:
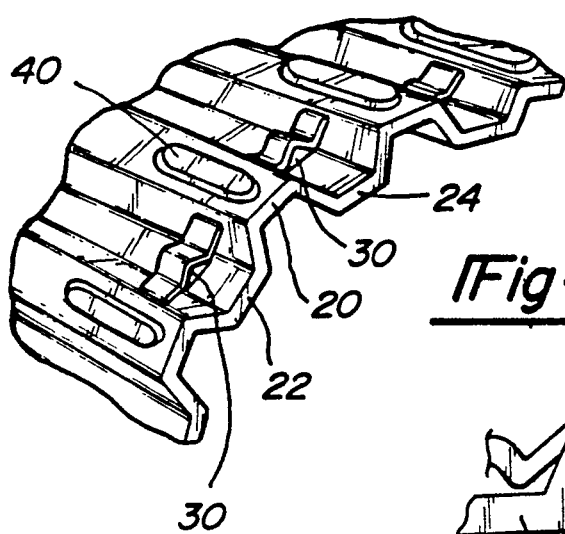
FIG. 5 is an elevational view of the portion of the splined assembly shown in FIG. 4.
Figure 4:
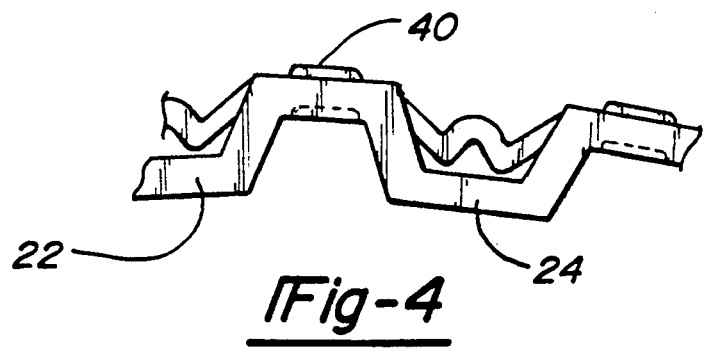
FIG. 4 is a fragmented perspective view of the splined assembly shown in FIG. 3, taken along view line 4—4, and illustrating the teachings of a second embodiment of this invention.

In a second embodiment of this invention, and as best shown in FIGS. 4 and 5, generally elliptically-shaped and substantially identical protruding or outwardly projecting portions 40 are formed or "punched out" from the housing member 12 and project outwardly from the surface of housing 12. More specifically, these portions 40 are positioned between each pair of adjacent splines 22, 24 and between each pair of adjacent slots 30, and further cooperatively oppose or prevent the deformation of portion 32 by adding columnar strength to each of the splines 22, 24 (and to member 12 in the vicinity of splines 22, 24). It should be realized that portions 40 may be of any desired shape and be of any desired dimension, the only requirement being that the portions provide the necessary strength to assembly 10.

It is to be understood that the invention is not limited to the exact construction illustrated and described above, or that various changes and modifications may be made without departing from the spirit and scope of the invention, as defined in the following claims. Moreover, it should also be realized that the use of the aforedescribed embodiments allow for the use of a relatively thin steel plate to form members 12, 14 and that this invention is applicable to assemblies having more than two rotating housing members.

I claim:

1. A method of manufacturing a housing, including splines formed therein, comprising the steps of:
    1) forming a housing having a central axis, forming a plurality of splines in said housing extending parallel to said central axis such that said housing has radially inner and radially outer portions defined by said splines;
    2) forming a plurality of circumferentially spaced grooves extending circumferentially along said radially inner portions, and extending radially outwardly from said radially inner portion; and
    3) attaching a band of reinforcing material on a radially outer surface of said radially outer portions, said band having portions circumferentially aligned with said grooves.

2. A method as recited in claim 1 wherein said band is positioned to be axially aligned with said grooves.

3. A method as recited in claim 1 wherein said grooves receive a snap ring.

4. A method of manufacturing a housing, including splines formed therein, comprising the steps of:
    1) forming a housing having a central axis, forming a plurality of splines in said housing extending parallel to said central axis such that said housing has radially inner and radially outer portions defined by said splines;
    2) forming a plurality of circumferentially spaced grooves extending circumferentially along said radially inner portions, and extending radially outwardly from said radially inner portion;
    3) attaching a band of reinforcing material on a radially outer surface of said radially outer portions, said band having portions circumferentially aligned with said slots, said band being positioned such that it is axially aligned with said slots; and
    4) positioning a snap ring in said slots.

* * * * *